US010783660B2

(12) United States Patent
Inoue et al.

(10) Patent No.: US 10,783,660 B2
(45) Date of Patent: Sep. 22, 2020

(54) DETECTING OBJECT POSE USING AUTOENCODERS

(71) Applicant: INTERNATIONAL BUSINESS MACHINES CORPORATION, Armonk, NY (US)

(72) Inventors: Tadanobu Inoue, Yokohama (JP); Sakyasingha Dasgupta, Shinagawa-ku (JP); Subhajit Chaudhury, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 15/901,473

(22) Filed: Feb. 21, 2018

(65) Prior Publication Data

US 2019/0259175 A1 Aug. 22, 2019

(51) Int. Cl.
*G06T 7/73* (2017.01)
*G06N 3/04* (2006.01)
*G06N 3/08* (2006.01)

(52) U.S. Cl.
CPC ............... *G06T 7/74* (2017.01); *G06N 3/04* (2013.01); *G06N 3/08* (2013.01); *G06T 2207/20081* (2013.01); *G06T 2207/20084* (2013.01)

(58) Field of Classification Search
USPC ......................................... 382/103, 155–159
See application file for complete search history.

(56) References Cited

U.S. PATENT DOCUMENTS

| 9,311,713 | B2 * | 4/2016 | Han | G06K 9/6259 |
|---|---|---|---|---|
| 10,163,003 | B2 * | 12/2018 | Chen | G06K 9/00201 |
| 10,424,079 | B2 * | 9/2019 | Viswanathan | G06K 9/627 |
| 10,482,607 | B1 * | 11/2019 | Walters | G06F 8/71 |
| 2017/0061625 | A1 | 3/2017 | Estrada et al. | |
| 2017/0148226 | A1 | 5/2017 | Zhang et al. | |

(Continued)

OTHER PUBLICATIONS

Grace Period Disclosure: Inoue et al., "Transfer Learning From Synthetic to Real Images Using Variational Autoencoders for Robotic Applications", arXiv:1709.06762v1 [cs.RO], Sep. 2017, 8 pages.

(Continued)

*Primary Examiner* — Ishrat I Sherali
(74) *Attorney, Agent, or Firm* — Tutunjian & Bitetto, P.C.; Vazken Alexanian

(57) ABSTRACT

Methods and a system are provided for detecting object pose. A method includes training, by a processor, a first autoencoder (AE) to generate synthetic output images based on synthetic input images. The method further includes training, by the processor, a second AE to generate synthetic output images, similar to the synthetic output images generated by the first AE, based on real input images. The method also includes training, by the processor, a neural network (NN) to detect the object pose using the synthetic output images generated by the first and second AEs. The method additionally includes detecting and outputting, by the processor, a pose of an object in a real input test image by inputting the real input test image to the second AE to generate a synthetic image therefrom, and inputting the synthetic image to the NN to generate an NN output indicative of the pose of the object.

13 Claims, 10 Drawing Sheets

(56) References Cited

U.S. PATENT DOCUMENTS

2018/0045519 A1* 2/2018 Ghadiok .............. G05D 1/0246
2018/0181802 A1* 6/2018 Chen .................. G06K 9/00201

OTHER PUBLICATIONS

Higgins et al., "DARLA: Improving Zero-Shot Transfer in Reinforcement Learning", Proceedings of the 34th International Conference on Machine Learning, PMLR 2017, Jul. 2017, 11 pages.
Rajpura et al., "Object Detection Using Deep CNNs Trained on Synthetic Images", arXiv:1706.06782v2 [cs.CV], Sep. 2017, 8 pages.
Santana et al., "Learning a Driving Simulator", arXiv:1608.01230v1 [cs.LG], Aug. 2016, pp. 1-8.
Shrivastava et al., "Learning from Simulated and Unsupervised Images through Adversarial Training", arXiv:1612.07828v2 [cs.CV], Jul. 2017, 13 pages.
Ylla, Ernest Bofill, Aalborg University Copenhagen, Department of Architecture, Design, and Media Technology, "Synthesizing Images to Recognize Natural Images with Transfer Learning in Convolutional Neural Networks", Jan. 2017, 56 pages.

\* cited by examiner

DETECTING OBJECT POSE USING AUTOENCODERS

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S): "Transfer learning from synthetic to real images using variational autoencoders for robotic applications", Tadanobu Inoue, Subhajit Chaudhury, Giovanni De Magistris, and Sakyasingha Dasgupta, Sep. 20, 2017, https://arxiv.org/abs/1709.06762 and https://youtu.be/Wd-1WU8emkw.

BACKGROUND

Technical Field

The present invention relates generally to information processing and, in particular, to detecting object pose using autoencoders (AEs).

Description of the Related Art

Large labeled datasets are important for training deep neural networks (DNNs). However, preparing many labeled real images is expensive and time-consuming.

Synthesizing labeled images for preparing training data has become appealing. However, learning from synthetic images may not achieve the desired performance in real environments due to, for example, a gap between synthetic and real images. Hence, there is a need for an improved approach to synthesize labeled images to make them more similar to corresponding real images.

SUMMARY

According to an aspect of the present invention, a computer-implemented method is provided for detecting object pose. The method includes training, by a processor, a first autoencoder (AE) to generate synthetic output images based on synthetic input images. The method further includes training, by the processor, a second AE to generate synthetic output images, similar to the synthetic output images generated by the first AE, based on real input images. The method also includes training, by the processor, a neural network (NN) to detect the object pose corresponding to a simulated environment using the synthetic output images generated by the first AE and the second AE. The method additionally includes detecting and outputting, by the processor, a pose of an object in a real input test image by inputting the real input test image to the second AE to generate a synthetic image therefrom, and then inputting the synthetic image to the NN to generate an NN output indicative of the pose of the object corresponding to an actual environment.

According to another aspect of the present invention, a computer-implemented method is provided for detecting object pose. The method includes training, by a processor, a first autoencoder (AE) to generate synthetic output images based on synthetic input images. The method further includes training, by the processor, a second AE to generate synthetic output images, similar to the synthetic output images generated by the first AE, based on real input images. The method also includes training, by the processor, a multi-layer perceptron (MLP) to detect object pose corresponding to a simulated environment using only encoder outputs and bypassing decoder outputs of the first AE. The method additionally includes detecting and outputting, by the processor, a pose of an object in a real input test image by inputting the real input test image to an encoder of the second AE to generate an encoded synthetic image therefrom, and inputting the encoded synthetic image to the MLP to generate an MLP output indicative of the pose of the object corresponding to an actual environment.

According to yet another aspect of the present invention, a system is provided for detecting object pose. The system includes a processor. The processor is configured to train a first autoencoder (AE) to generate synthetic output images based on synthetic input images. The processor is further configured to train a second AE to generate synthetic output images, similar to the synthetic output images generated by the first AE, based on real input images. The processor is also configured to train a neural network (NN) to detect the object pose corresponding to a simulated environment using the synthetic output images generated by the first AE and the second AE. The processor is additionally configured to detect and output a pose of an object in a real input test image by inputting the real input test image to the second AE to generate a synthetic image therefrom, and then inputting the synthetic image to the NN to generate an NN output indicative of the pose of the object corresponding to an actual environment.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to detecting object pose (e.g., positions and/or angles), using autoencoders (AEs). For the sake of illustration, one or more embodiments herein may be described with respect to variational autoencoders. However, it is to be appreciated that the present invention can utilize any type of autoencoder including, for example, but not limited to, deep spatial autoencoders, variational autoencoders, and so forth, as readily appreciated by one of ordinary skill in the art given the teachings of the present invention provided herein, while maintaining the spirit of the present invention.

In an embodiment, the present invention uses two variational autoencoders (VAEs) configured to generate similar images from synthetic and real images for the purpose of detecting object position. To that end, in an embodiment, the present invention can make generated training images and generated test images be similar to each other. In an embodiment, non-realistic blurry images can be allowed on VAE outputs. In an embodiment, the present invention can provide improved detecting performance over conventional approaches while using a significantly small real image dataset.

Advantageously, the present invention can be used to provide near human-level control in robotics for specific tasks, to name one of a myriad of possible scenarios and applications to which the present invention can be applied, as readily appreciated by one of ordinary skill in the art given the teachings of the present invention provided herein, while maintaining the spirit of the present invention.

These and other features of the present invention are described in further detail herein below.

Figure 1:
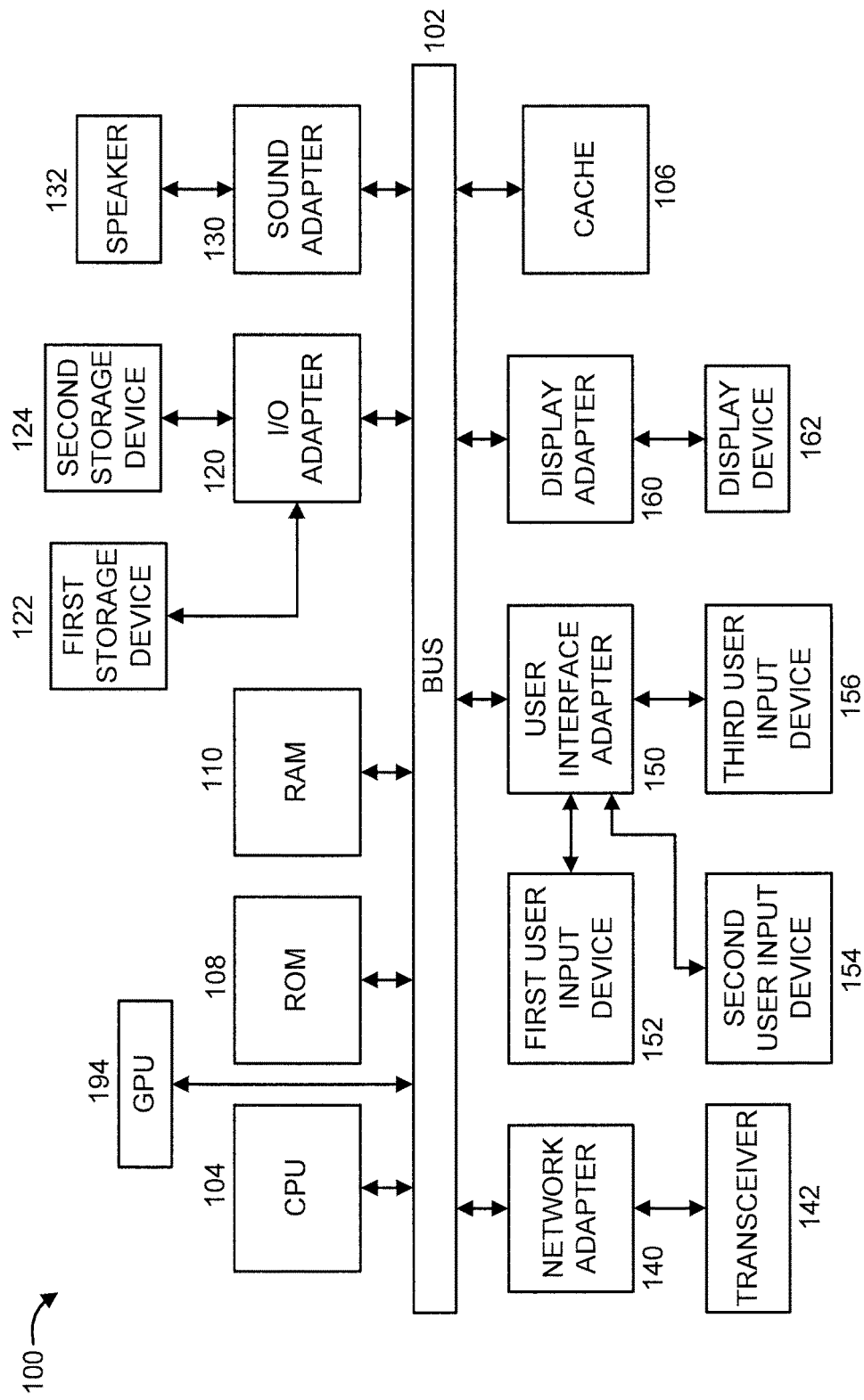
FIG. 1 is a block diagram showing an exemplary processing system to which the invention principles may be applied, in accordance with an embodiment of the present invention.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
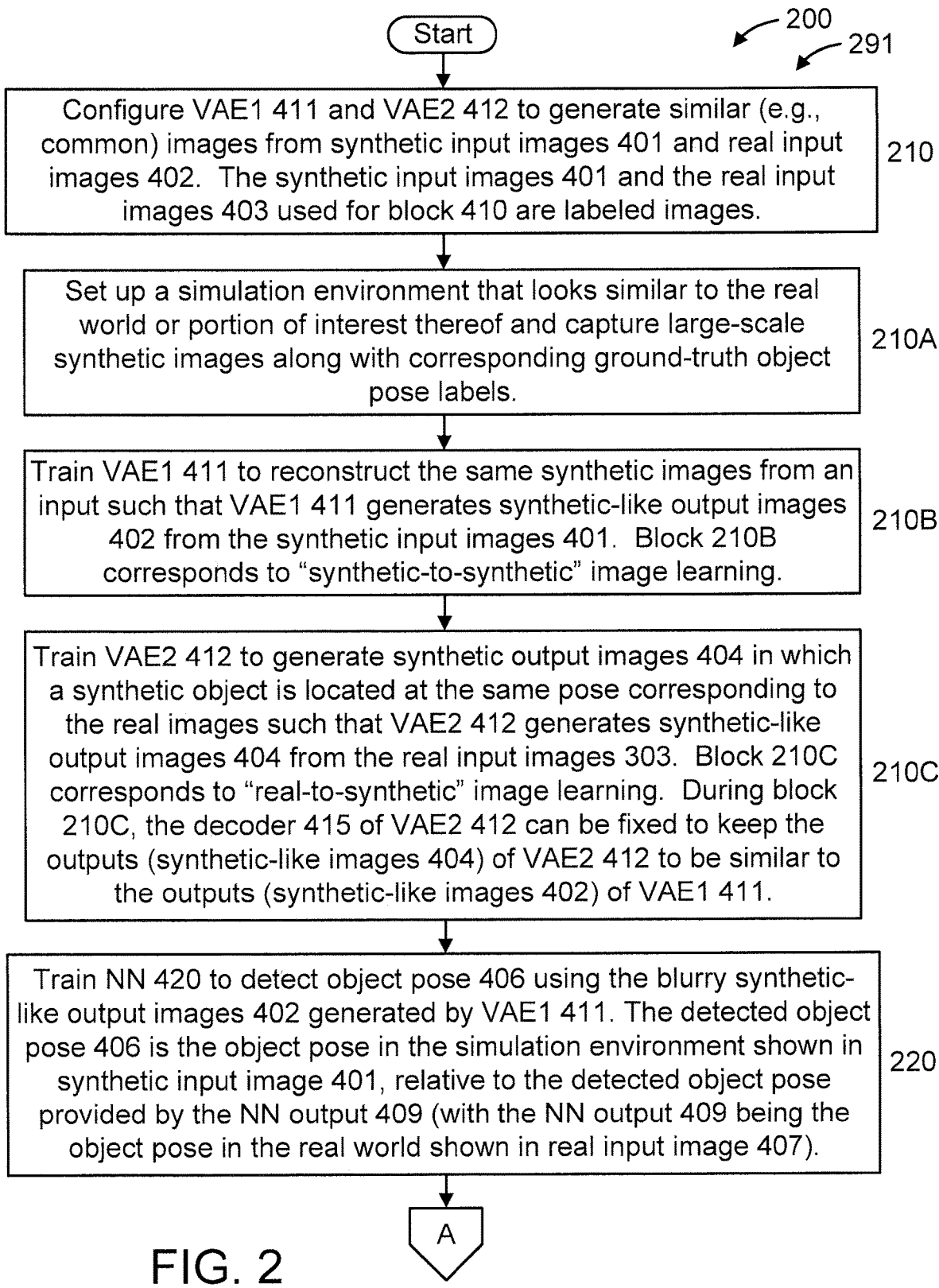
FIGS. 2-3 are flow diagrams showing an exemplary method for detecting object position using variational autoencoders (VAEs), in accordance with an embodiment of the present invention.
Figure 3:
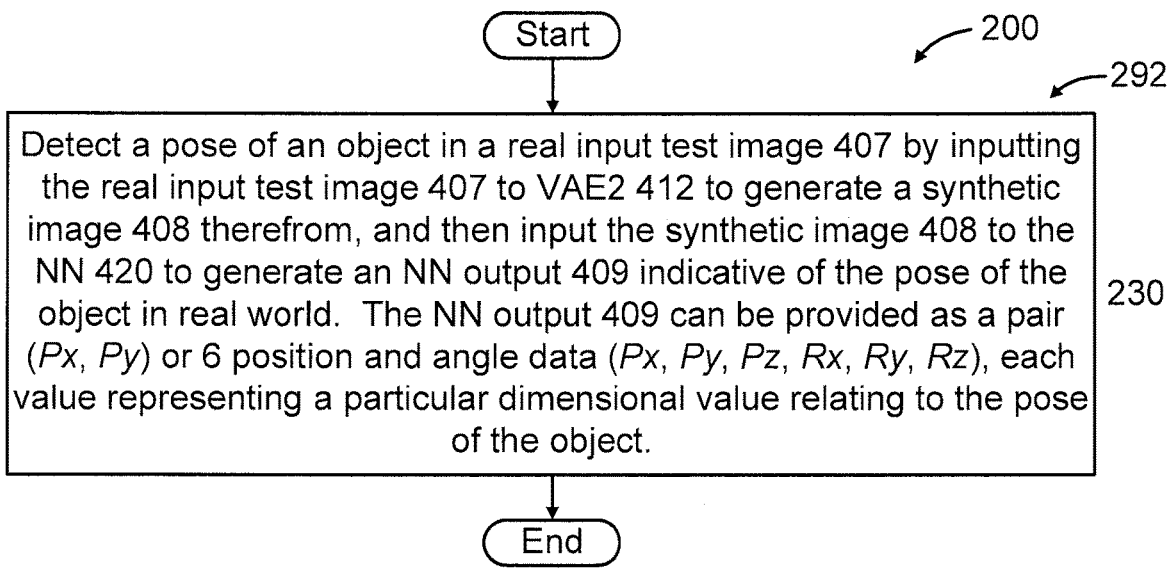
Figure 4:
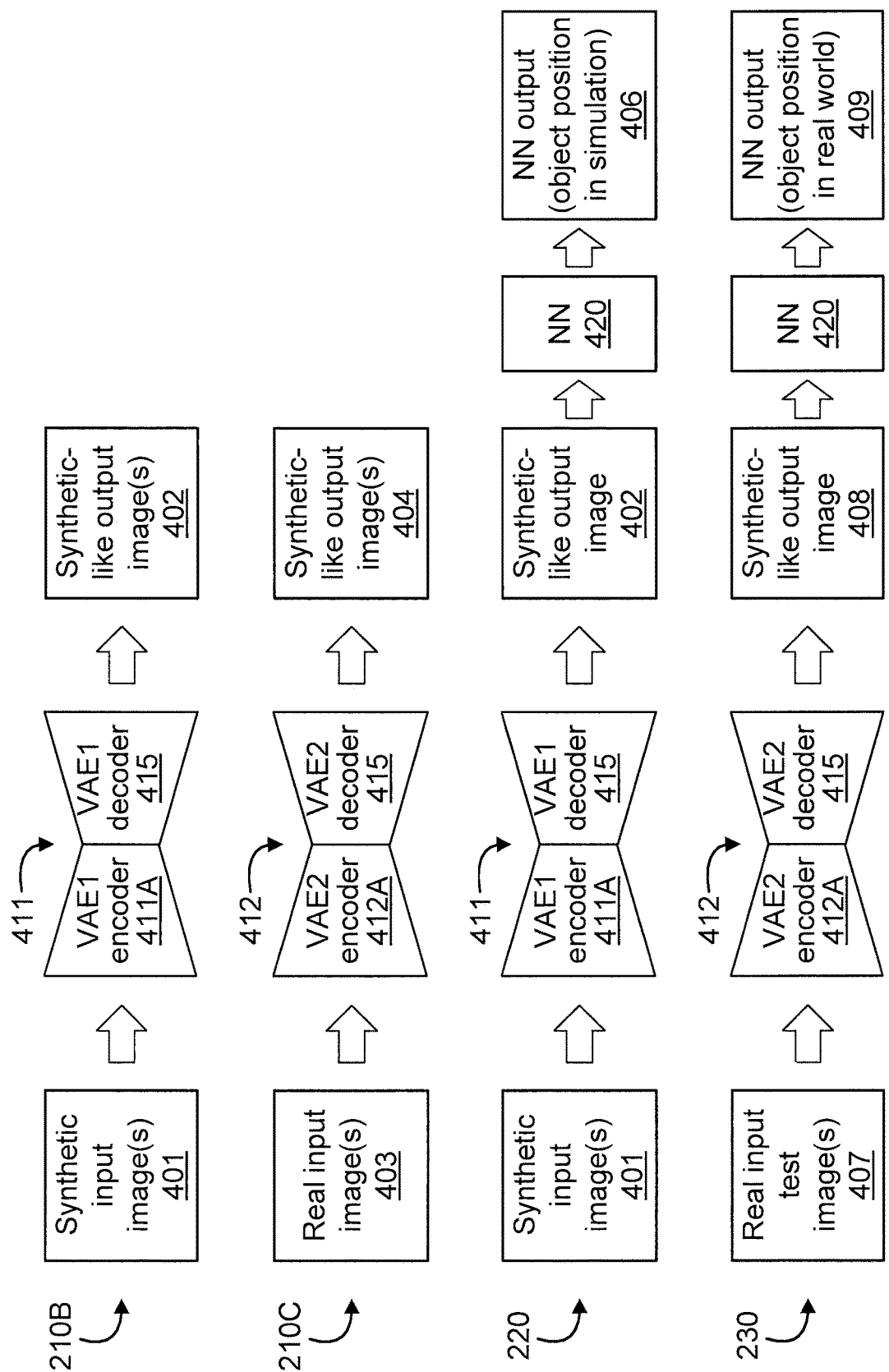
FIG. 4 is a block diagram graphically showing some of the steps/blocks of the method of FIGS. 2-3, in accordance with an embodiment of the present invention.

FIGS. 2-3 are flow diagrams showing an exemplary method 200 for detecting object pose using variational autoencoders (VAEs), in accordance with an embodiment of the present invention. FIG. 4 is a block diagram graphically showing some of the steps/blocks of the method 200 of FIGS. 2-3, in accordance with an embodiment of the present invention.

In the embodiments of FIGS. 2-4, the method 200 involves a variational autoencoder (hereinafter "VAE") 410 formed from a first generative neural network (NN) VAE (hereinafter "VAE1") 411, a second generative NN VAE 412 (hereinafter "VAE2"). The method 200 further involves a NN 420. VAE1 411 includes an encoder 411A and a decoder 415. VAE2 412 includes an encoder 412A and a decoder 415. VAE1 411 and VAE2 412 have distinct encoder layers, but have the same decoder. In the embodiments of FIGS. 2-4, the method 200 is used to detect object pose using VAE1 411 and VAE2 412, which are configured to generate similar images from synthetic and real images. Hence, method 200 detects a real object pose from raw RGB-D (Red, Green, Blue, depth) image data. In other embodiments, the image data can be gray scale image, RGB color image, and only depth data, in addition to RGB-D data.

In an embodiment, method 200 includes blocks 210 through 230. In an embodiment, blocks 210 through 220 correspond to a training phase 291 of method 200, while block 230 corresponds to a testing phase 292 of method 200.

At block 210, configure VAE1 411 and VAE2 412 to generate similar (e.g., common) images from synthetic input images 401 and real input images 402. The synthetic input images 401 and the real input images 403 used for block 210 are labeled images and can form image pairs as described below.

In an embodiment, block 210 can include one or more of blocks 210A-210C.

At block 210A, set up a simulation environment that looks similar to the real world or portion of interest thereof and capture large-scale synthetic images along with corresponding ground-truth object pose labels.

At block 210B, train VAE1 411 to reconstruct the same synthetic images from an input such that VAE1 411 generates synthetic-like output images (hereinafter interchangeably referred to as "synthetic output images" in short) 402 from the synthetic input images 401. That is, the synthetic-like output images 402 can be blurry and different from original synthetic input images 401, but they look similar. Block 210B corresponds to "synthetic-to-synthetic" image learning.

At block 210C, train VAE2 412 to generate synthetic output images 404 in which a synthetic object is located at the same pose corresponding to the real images such that VAE2 412 generates synthetic-like output images (hereinafter interchangeably referred to as "synthetic output images" in short) 404 from the real input images 403. Block 210C corresponds to "real-to-synthetic" image learning. In an embodiment (during block 210C), the decoder 415 of VAE2 412 can be fixed to keep the outputs (synthetic-like images 404) of VAE2 412 to be similar to the outputs (synthetic-like images 402) of VAE1 411 (again noting that VAE1 411 and VAE2 412 have the same decoder 415, despite having different encoder layers 411A and 412A, respectively). As used herein, the phrase fixing the decoder refers to fixing neural network weights during training. Usually we don't fix neural network weights during training and then we can obtain neural network weights to output expected results. At this step in this embodiment, we do not change the weights of the decoder and concentrate the training on the weights of the encoder. As used herein, similar phrases refer to the similarity of two output images from VAE1 411 and VAE2 412. The two VAEs 411 and 412 use the same decoder 415 and output similar images which are synthetic-like can be a little bit blurry.

At block 220, train NN 420 to detect object pose (e.g., Px, Py) 406 using the blurry synthetic-like output images 402 generated by VAE1 411. The detected object pose 406 is the object pose in the simulation environment shown in synthetic input image 401, relative to the detected object pose provided by the NN output 409 (with the NN output 409 being the object pose in the real world shown in real input image 407).

At block 230, detect a pose of an object in a real input test image 407 by inputting the real input test image 407 to VAE2 412 to generate a synthetic-like image (hereinafter interchangeably referred to as "synthetic output image" in short) 408 therefrom, and then input the synthetic image 408 to the NN 420 to generate an NN output 409 indicative of the pose of the object in the real world (i.e., corresponding to an actual environment versus a simulated environment). In an embodiment, the NN output 409 can be provided, depending upon the implementation, as a pair (Px, Py) or 6 position and angle data (Px, Py, Pz, Rx, Ry, Rz), each value representing a particular dimensional value relating to the pose of the object. For example, in an embodiment, the NN output 407 can be provided as "(Px, Py)", corresponding to the x and y dimensions, respectively. In another embodiment, which may relate an area such as, but not limited to robotics, the "pose" information provided by the present invention can include one or more of positions (Px, Py, Pz) and/or one or more of angles (Rx (roll), Ry (pitch), Rz (yaw), depending upon the implementation.

Figure 5:
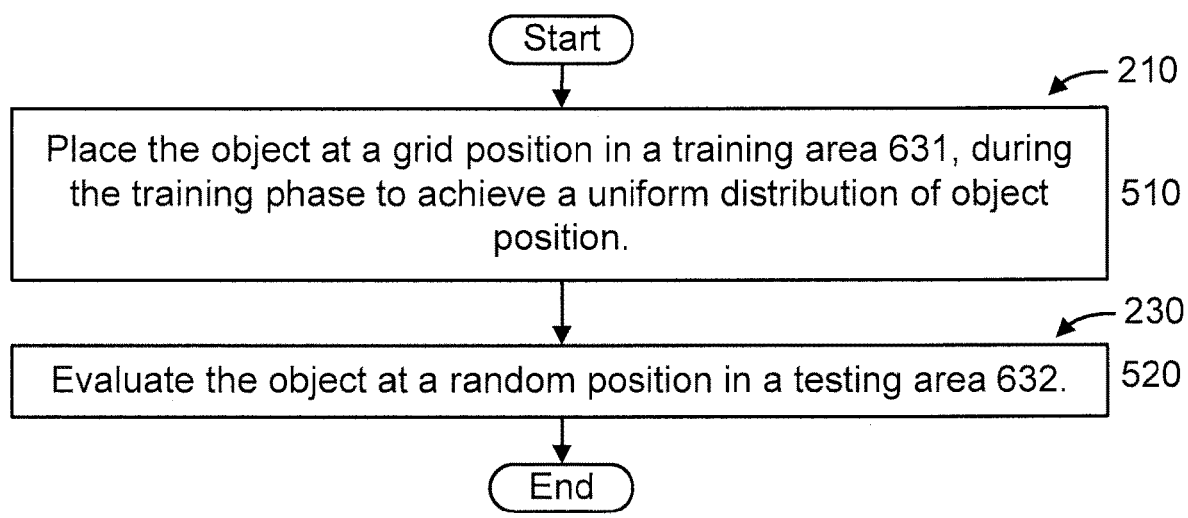
FIG. 5 is a flow diagram further showing aspects of a step/block and another step/block of the method of FIGS. 2-3, in accordance with an embodiment of the present invention.
Figure 6:
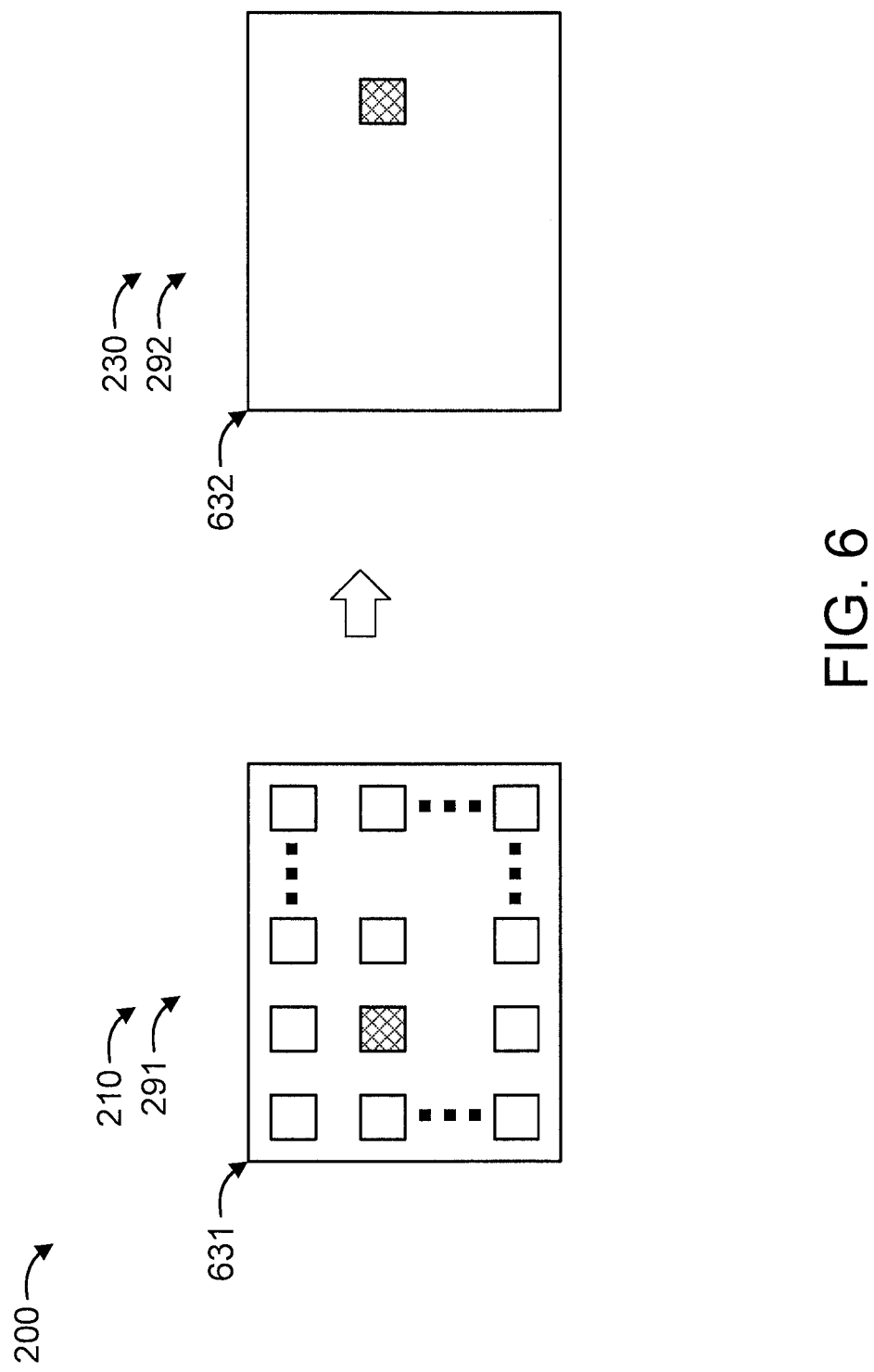
FIG. 6 is a block diagram further graphically showing aspects of a step/block and another step/block of the method of FIGS. 2-3, in accordance with an embodiment of the present invention.

FIG. 5 is a flow diagram further showing aspects of step/block 210 and step/block 230 of method 200 of FIGS. 2-3, in accordance with an embodiment of the present invention. FIG. 6 is a block diagram further graphically showing aspects of step/block 210 and step/block 230 of method 200 of FIGS. 2-3, in accordance with an embodiment of the present invention.

At block 510, corresponding to the training phase 291, place the object at a grid position in a training area 631, during the training phase to achieve a uniform distribution of object position.

At block 520, corresponding to the testing phase 292, evaluate the object at a random position in a testing area 632. We perform domain transfer from synthetic environment to a real one by using the above trained NN, in order to detect objects placed at random positions.

It is to be appreciated that the training area 631 and the testing area 632 can be of the same size.

Figure 7:
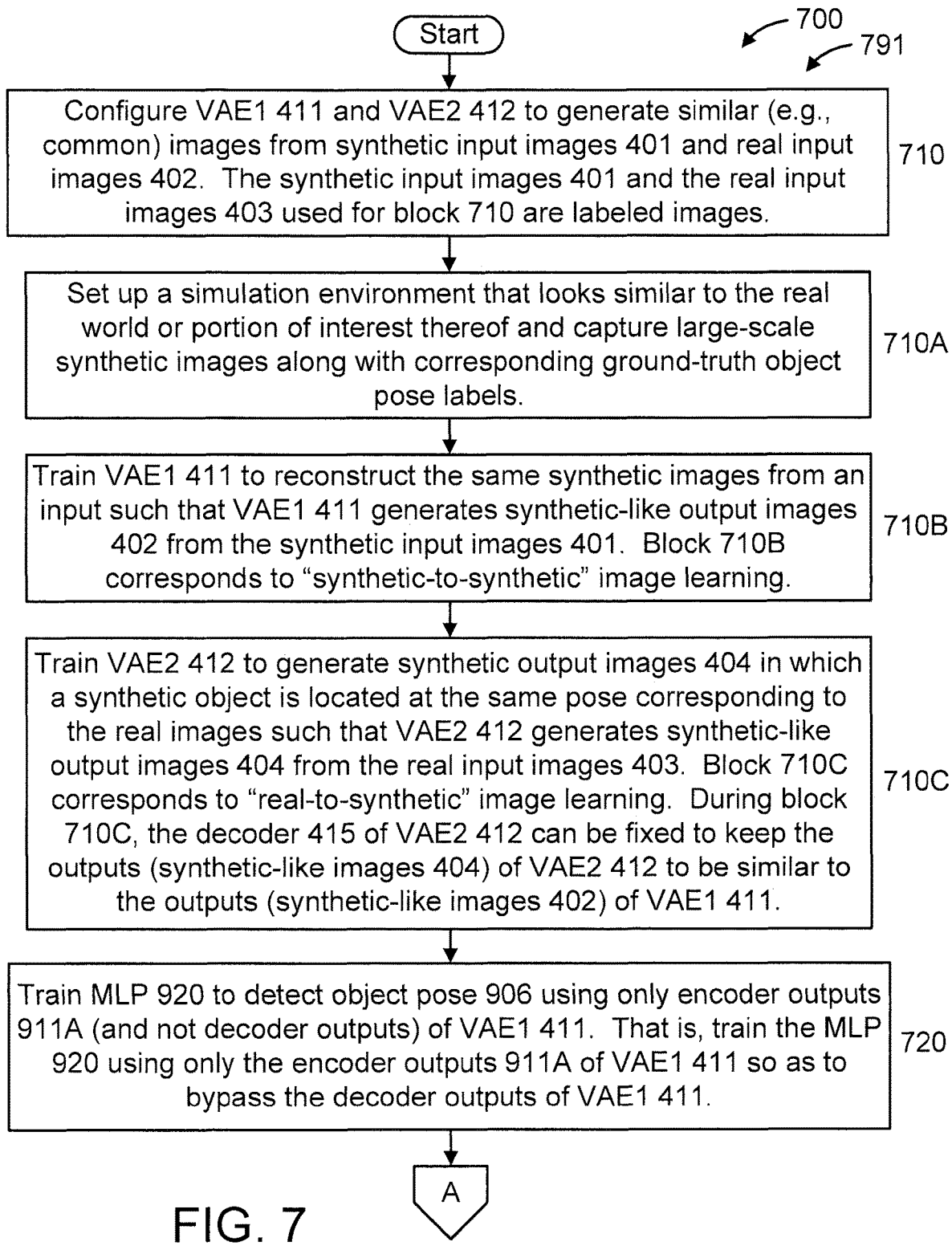
FIGS. 7-8 are flow diagrams showing an exemplary method for detecting object position using variational autoencoders (VAEs), in accordance with an embodiment of the present invention.
Figure 8:
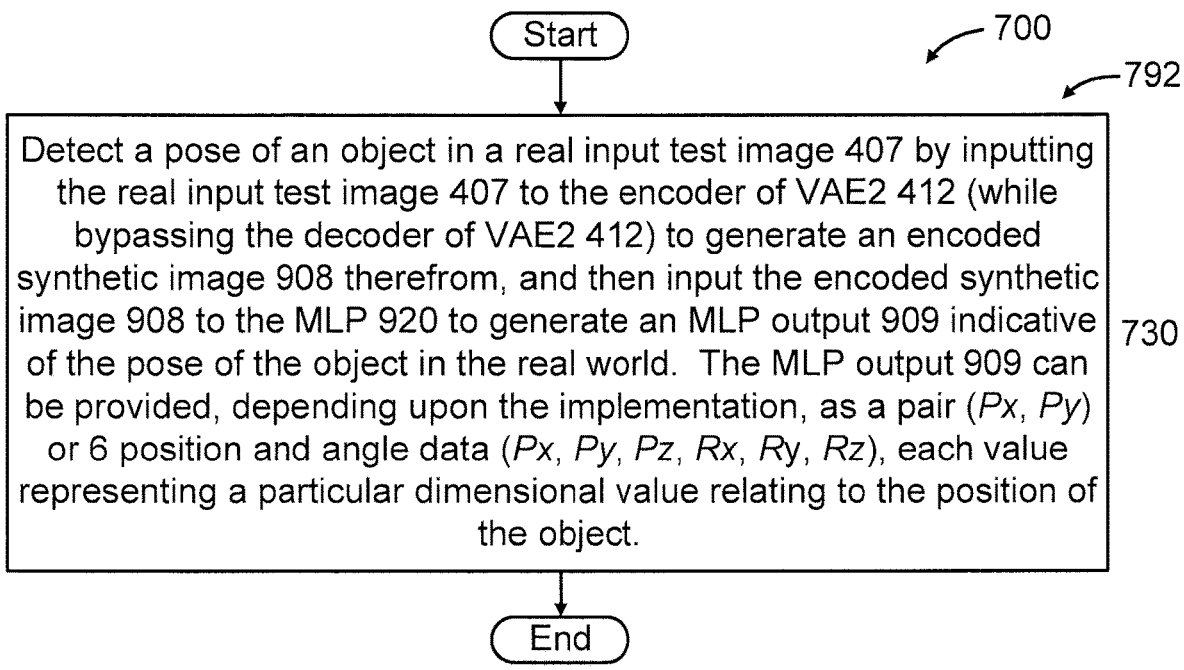
Figure 9:
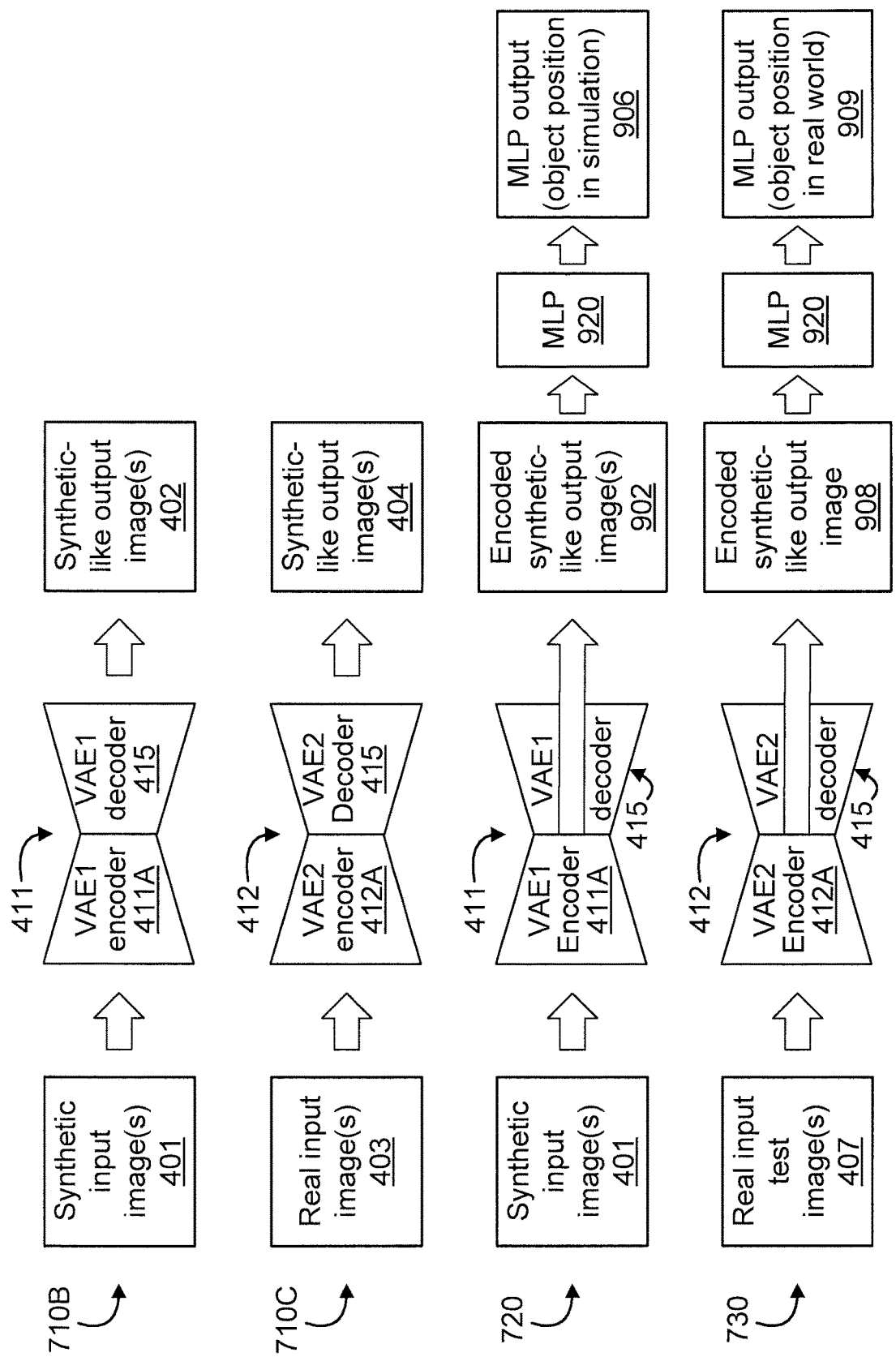
FIG. 9 is a block diagram graphically showing some of the steps/blocks of the method of FIGS. 7-8, in accordance with an embodiment of the present invention.

FIGS. 7-8 are flow diagrams showing an exemplary method 700 for detecting object pose using variational autoencoders (VAEs), in accordance with an embodiment of the present invention. FIG. 9 is a block diagram graphically showing some of the steps/blocks of the method 700 of FIGS. 7-8, in accordance with an embodiment of the present invention.

In the embodiments of FIGS. 7-9, the method 700 involves a variational autoencoder (hereinafter "VAE") 410 formed from a first generative neural network (NN) VAE (hereinafter "VAE1") 411, a second generative NN VAE 412 (hereinafter "VAE2"), similar to method 200 of FIGS. 2-3. The method 700 further involves a multi-layer perceptron (MLP) 920. VAE1 411 includes an encoder 411A and a decoder 415. VAE2 412 includes an encoder 412A and a decoder 415. VAE1 411 and VAE2 412 have distinct encoder layers, but have the same decoder. In the embodiments of FIGS. 7-9, the method 700 is used to detect object pose using VAE1 311 and VAE2 412, which are configured to generate similar images from synthetic and real images. Hence, method 700 detects a real object pose from raw RGB-D (Red, Green, Blue, depth) image data. In other embodiments, the image data can be gray scale image, RGB color image, and only depth data, in addition to RGB-D data.

In an embodiment, method 700 includes blocks 710 through 730. In an embodiment, blocks 710 through 720 correspond to a training phase 791 of method 700, while block 730 corresponds to a testing phase 792 of method 700.

At block 710, configure VAE1 311 and VAE2 312 to generate similar (e.g., common) images from synthetic input images 401 and real input images 402. The synthetic input images 401 and the real input images 403 used for block 710 are labeled images and can form image pairs as described below.

In an embodiment, block 710 can include one or more of blocks 710A-710C.

At block 710A, set up a simulation environment that looks similar to the real world or portion of interest thereof and capture large-scale synthetic images along with corresponding ground-truth object pose labels.

At block 710B, train VAE1 411 to reconstruct the same synthetic images from an input such that VAE1 411 generates synthetic-like output images (hereinafter interchangeably referred to as "synthetic output images" in short) 402 from the synthetic input images 401. That is, the synthetic-like output images 402 can be blurry and different from original synthetic input images 401, but they look similar. Block 710B corresponds to "synthetic-to-synthetic" image learning.

At block 710C, train VAE2 412 to generate synthetic output images 404 in which a synthetic object is located at the same pose corresponding to the real images such that VAE2 412 generates synthetic-like output images (hereinafter interchangeably referred to as "synthetic output images" in short) 404 from the real input images 403. Block 710C corresponds to "real-to-synthetic" image learning. In an embodiment (during block 710C), fix the decoder 415 of VAE2 412 to keep the outputs (synthetic images 404) of VAE2 312 to be similar to the outputs (synthetic images 402) of VAE1 411 (again noting that VAE1 411 and VAE2 412 have the same decoder 415, despite having different encoder layers 411A and 412A, respectively). An example of how the decoder is fixed is described above with respect to step 210C.

At block 720, train MLP 920 to detect object pose 906 corresponding to a simulated environment using only encoder outputs 902 (and not decoder outputs) of VAE1 encoder 411A. That is, train the MLP 920 using only the encoder outputs 902 of VAE1 encoder 411A so as to bypass the decoder outputs of VAE1 411. It is to be appreciated that the training time of block 720 will be shorter than the training time of block 220 of method 200.

At block 730, detect a pose of an object in a real input test image 407 by inputting the real input test image 407 to the encoder of VAE2 412 (while bypassing the decoder of VAE2 412) to generate an encoded synthetic-like image (hereinafter interchangeably referred to as "synthetic output image" in short) 908 therefrom, and then input the encoded synthetic image 908 to the MLP 920 to generate an MLP output 909 indicative of the pose of the object in the real world (i.e., corresponding to an actual environment versus a simulated environment). In an embodiment, the MLP output 909 can be provided, depending upon the implementation, as a pair (Px, Py) or 6 position and angle data (Px, Py, Pz, Rx, Ry, Rz), each value representing a particular dimensional value relating to the position of the object. For example, in an embodiment, the MLP output can be provided as "(Px, Py)", corresponding to the x and y dimensions, respectively. In another embodiment, which may relate an area such as, but not limited to robotics, the "pose" information provided by the present invention can include one or more of positions (Px, Py, Pz) and/or one or more of angles (Rx (roll), Ry (pitch), Rz (yaw), depending upon the implementation.

Figure 10:
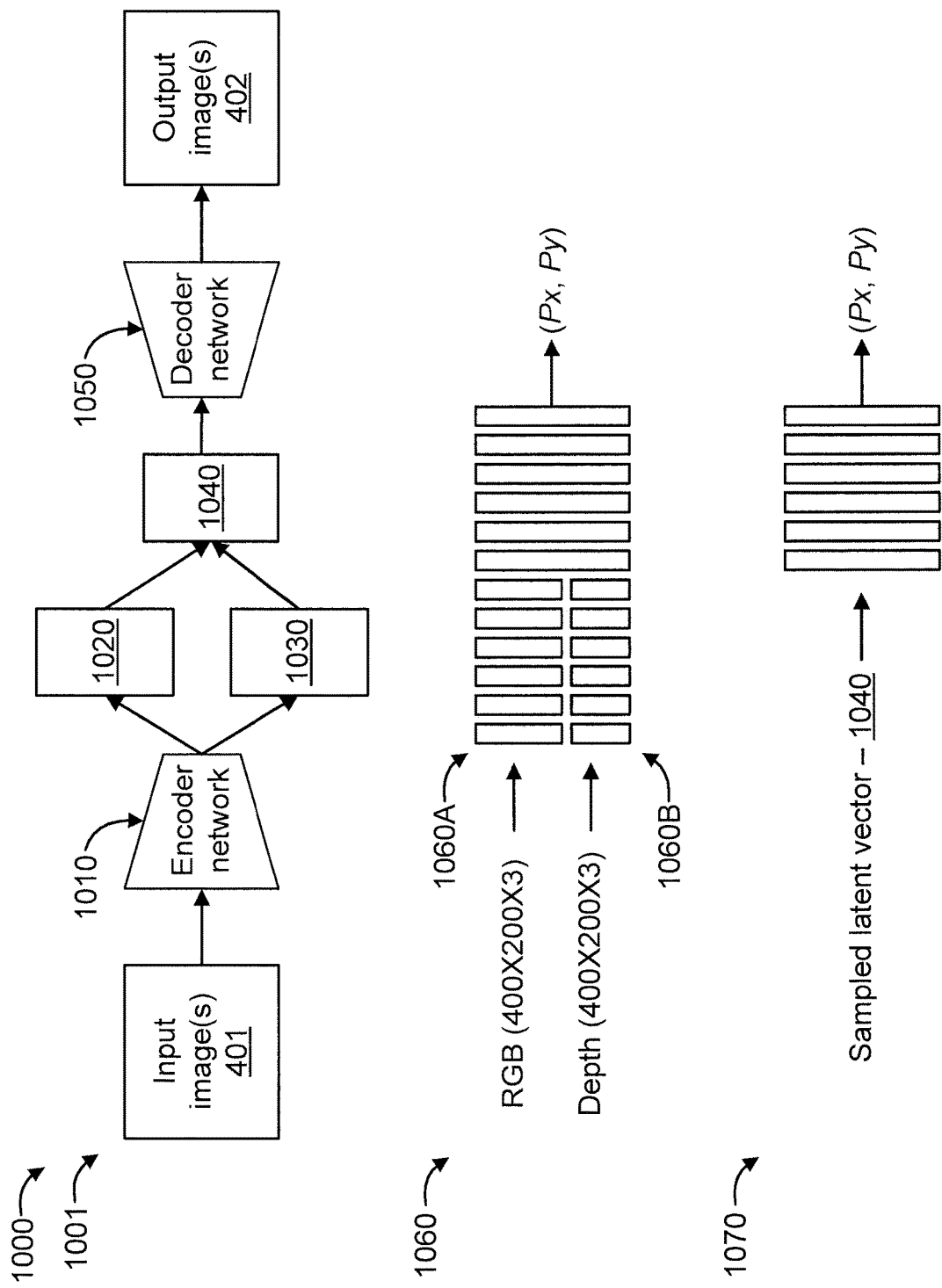
FIG. 10 is a block diagram showing network structures to which the present invention can be applied, in accordance with an embodiment of the present invention.

FIG. 10 is a block diagram showing network structures 1000 to which the present invention can be applied, in accordance with an embodiment of the present invention.

The network structures 1000 relate to a VAE 1001 and include an encoder network 1010, a mean vector 1020, a standard deviation vector 1030, a sampled latent vector 1040, and a decoder network 1050.

The encoder network 1010 receives an input image 1001 (e.g., 400×200×4), and the decoder network 1050 outputs an output image 1002 (e.g., 400×200×4).

In an embodiment, the encoder network 1010 is formed from one or more convolutional neural networks. In an embodiment, the decoder network 1050 is formed from one or more deconvolutional neural networks. Of course, other types of neural networks and/or learning structures can also be used in accordance with the teachings of the present invention, given the teachings of the present invention provided herein, while maintaining the spirit of the present invention.

The network structures 1000 further relate to a CNN 1060 having an RGB processing portion 1060A for receiving and processing RGB data and a depth processing portion 1060B for receiving and processing depth data to output position data (e.g., (Px, Py).

The network structures further relate to a MLP 1070 for receiving and processing a sampled latent vector 1040 to output position data (e.g., (Px, Py).

Any of the networks 1010, 1050, and 1060 (noting that an MLP is a type of (feedforward) neural network) can include one or more of the following sets of layers: a set of convolutional layers; a set of max pooling layers; a set of fully connected layers; and a set of up-sampling layers. In any event, the MLP 1070 will include at least 3 layers, namely an input layer, an output layer, and one or more hidden layers.

A further description will now be given regarding various aspects of the present invention, in accordance with one or more embodiments of the present invention.

The description will commence by more fully stating a problem to which the present invention is applied, followed by a description of various aspects of the present invention relating to object position detection using VAEs.

When we have two labeled image datasets (one synthesized in a simulation environment, and the other captured in the real world), we can assume image instances as $X_S = \{x_S^i\}_{i=1:N}$ and $X_R = \{x_R^i\}_{i=1:M}$ with S representing synthetic image data and R representing real image data, respectively. Since it is easy to synthesize many images for expected labels in a simulation environment and expensive to capture many images for expected labels in the real world, typically M<<N. We thus aim to extract meaningful information, $y_R^{(i)} = f(x_R^i)$, from the real world images that we can use for subsequent tasks of interest.

However, due to time and cost constraints, it is difficult to collect sufficiently large amounts of real world images to guarantee asymptotic convergence of the function of our interest, i.e., f. We take an approach of modeling a given scene within a simulation environment in order to learn the function mapping, $y_S^{(i)} = f(x_S^i)$. This is done based on a large amount of corresponding synthetic images which can be collected easily in simulation. Given this setting, we want to learn a conditional distribution of synthetic images given the real world images, $p(x_S|x_R)$, by minimizing the following error:

$$L = \mathbb{E}_{p(x_S|x_R)}(\|f(x_R) - f(x_S)\|^2) \qquad (1)$$

where the expectation with respect to the conditional distribution minimizes the distance between the feature maps obtained from the real images and the feature maps of the corresponding reconstructed synthetic images obtained from the real images based on the conditional distribution $p(x_S|x_R)$.

Herein, we focus on detecting real object positions from raw RGB-D (red, green, blue, depth) image data using this formulation as our target task for evaluating transfer learning. First, we train deep neural networks (DNN) with a large number of synthetic image data as well as a small number of real image data along with their corresponding object position information. In order to prepare the data for training, we assume the object is put at a grid position during the training phase to achieve a uniform distribution of object position as shown on the left side of FIG. 6 corresponding to training phase 291. At the time of inference, as shown on the right side of FIG. 6 corresponding to testing phase 292, we perform domain transfer from a synthetic environment to a real one by using the above trained DNN, in order to detect objects placed at random positions.

We now further describe detecting object positions using VAEs, in accordance with one or more embodiments of the present invention.

FIG. 4 mentioned above graphically depicts an embodiment of the present invention. An underlying principle of this approach is that the distribution of image features may vary between simulated and real environments, but the output labels, like object position, should remain invariant for the same scene. We use two VAEs for generating similar common images from synthetic and real image data and use this common data distribution to train a convolutional neural network (CNN) to predict the object position with improved accuracy. Note that although we use two VAEs with distinct encoder layers as generative models for images, they have the same decoder, which is used to train the CNN. Thus, even if the VAE generates blurry images, the ensuing CNN will learn to predict from this skewed but common image distribution. Since the CNN can be trained with many generated images from the synthetic domain, we can achieve improved object position estimation from a very limited set of labeled real images.

At least FIGS. 2-4 below respectively describe and show the steps involved in an embodiment of the present invention. These steps can include the following, stated generally as:

(a) prepare two VAEs that output pseudo-synthetic images from both synthetic and real images;
(b) train a CNN to detect object positions using the output of trained VAE in (a); and
(c) detect object positions by transforming domains using the trained VAE and CNN.

First, we prepare two VAEs to generate similar images from synthetic and real images. We set up a simulation environment that looks similar to the real world and capture large-scale synthetic images $\{x_S^i\}_{i=1:N}$ along with corresponding ground-truth object position labels, $\{(t_x^i, t_y^i)\}_{i=1:N}$. We train VAE1, which encodes and decodes from a synthetic image to the same synthetic image.

The encoder compresses the input image to the latent representations z, and the decoder reconstructs the image back from this latent space. However, using the encoder-decoder results in an intractable posterior distribution $p(z|x_S)$, so we optimize the encoder parameters by variational inference and decoder parameters by minimizing the negative log likelihood of the data. Using this method, we obtain the optimal parameters ($\theta,\phi$) by minimizing the lower bound given as follows:

$$\mathcal{L}_S(\theta,\phi;x_S^i) = D_{KL}(q_\phi^S(z^i|x_S^i)\|p_\theta(z^i)) - \mathbb{E}(\log p_\theta(x_S^i|z)) \quad (2)$$

where $p_\theta(z^i)$ is the prior distribution of the latent representation, which is typically the Gaussian with zero mean and unit variance.

We copy the weights of VAE1 to a VAE that has the same structure (VAE2) and then train VAE2, which encodes and decodes from a real image to the corresponding synthetic image as graphically shown in FIG. 4. During the training, we fix the decoder layers and adapt only the parameters for the encoder part, which receives the real images as input, corresponding to the conditional distributing $q_\beta^R(z|x_R)$ with encoder parameters $\beta$. This is equivalent to forcing the latent space obtained from the synthetic and real images to be identical. We obtain the optimal parameter by minimizing the following lower bound:

$$\mathcal{L}_{R2S}(\beta;x_S^i) = D_{KL}(q_\beta^R(z^i|x_R^i)\|p_\theta(z^i)) - \mathbb{E}(\log p_\theta(x_S^i|z)) \quad (3)$$

In the above optimization, note that $(x_S^i, x_R^i)$ are matching pairs of corresponding synthetic and real images. The learned encoder, $q_\beta^R(z|x_R)$, and decoder, $p_\theta(x_S^i|z)$, can be combined to obtain the desired conditional distribution $p(x_S|x_R)$, which can generate pseudo-synthetic images as output from the corresponding real image as input. VAE2 outputs can be subsequently used to obtain accurate object positions from a CNN trained purely in the synthetic image domain.

Next, we train a CNN for detecting object positions as graphically shown in FIG. 4. Due to the availability of a large training dataset synthesized in a simulation environment, we can obtain a good prediction by a trained CNN for detecting object positions. To overcome the gap between synthetic and real images, we use the outputs of the trained VAEs in the above step, instead of using synthetic images directly.

Finally, we can detect object positions in the real world as shown in FIG. 4. VAE2 outputs blurry pseudo-synthetic common images, and the CNN trained with the similar common images outputs object position.

There can be alternate strategies in steps (b) and (c), for example, as described above relative to at least FIGS. 7-9. In the above description, we train the CNN by using VAE1 output, but we can also train a multilayer perceptron (MLP) by using the latent representations obtained from the encoder of VAE1 in step (b). Since VAE1 and VAE2 have similar latent space structures, we can use latent space output from VAE2 combined with the above trained MLP to detect object position.

These and other variations of the present invention are readily determined by one of ordinary skill in the art, given the teachings of the present invention provided herein, while maintaining the spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for detecting object pose, comprising:

training, by a processor, a first autoencoder (AE) to generate synthetic output images based on synthetic input images;

training, by the processor, a second AE to generate synthetic output images, similar to the synthetic output images generated by the first AE, based on real input images;

training, by the processor, a neural network (NN) to detect the object pose corresponding to a simulated environment using the synthetic output images generated by the first AE and the second AE; and detecting and outputting, by the processor, a pose of an object in a real input test image by inputting the real input test image to the second AE to generate a synthetic image therefrom, and then inputting the synthetic image to the NN to generate an NN output indicative of the pose of the object corresponding to an actual environment.

2. The computer-implemented method of claim 1, wherein said first training step corresponds to synthetic-to-synthetic image learning, and said second training step corresponds to real-to-synthetic image learning.

3. The computer-implemented method of claim 1, wherein during said second training step, a decoder of the second AE is fixed in order to generate the synthetic output images generated by the second AE to be similar to the synthetic output images generated by the first AE.

4. The computer-implemented method of claim 1, further comprising configuring the first AE and the second AE to have respectively distinct encoding layers and common decoding layers.

5. The computer-implemented method of claim 4, wherein the respectively distinct encoding layers in the first AE and the second AE are implemented by respective sets of one or more convolutional neural networks, and the common decoding layers are implemented by a set of one or more deconvolutional neural networks.

6. The computer-implemented method of claim 4, wherein the NN is configured to detect the pose of the object based on a commonness between outputs of the common decoding layers of the first and second AEs.

7. The computer-implemented method of claim 1, wherein the NN output comprises a first value corresponding to a first dimension and a second value corresponding to a second dimension.

8. The computer-implemented method of claim 1, wherein the NN is a convolutional neural network.

9. The computer-implemented method of claim 1, wherein the AE is a variational autoencoder.

10. A non-transitory article of manufacture tangibly embodying a computer readable program which when executed causes a computer to perform the steps of claim 1.

11. A system for detecting object pose, comprising:

a processor, configured to train a first autoencoder (AE) to generate synthetic output images based on synthetic input images;

train a second AE to generate synthetic output images, similar to the synthetic output images generated by the first AE, based on real input images;

train a neural network (NN) to detect the object pose corresponding to a simulated environment using the synthetic output images generated by the first AE and the second AE; and detect and output a pose of an object in a real input test image by inputting the real input test image to the second AE to generate a synthetic image therefrom, and then inputting the synthetic image to the NN to generate an NN output indicative of the pose of the object corresponding to an actual environment.

12. The system of claim 11, wherein the processor trains the second AE by fixing a decoder of the second AE in order to skew the synthetic output images generated by the second AE to be similar to the synthetic output images generated by the first AE.

13. The system of claim 11, wherein the first AE and the second AE have respectively distinct encoding layers and common decoding layers.

* * * * *